(12) United States Patent
Itskovich et al.

(10) Patent No.: US 9,746,574 B2
(45) Date of Patent: Aug. 29, 2017

(54) RESISTIVITY IMAGER FOR CONDUCTIVE AND NON-CONDUCTIVE MUD

(71) Applicant: BAKER HUGHES INCORPORATED, Houston, TX (US)

(72) Inventors: Gregory B. Itskovich, Houston, TX (US); Stanislav Forgang, Houston, TX (US); Sven Krueger, Winsen (DE); Fei Le, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 43 days.

(21) Appl. No.: 15/003,630

(22) Filed: Jan. 21, 2016

(65) Prior Publication Data

US 2017/0212269 A1 Jul. 27, 2017

(51) Int. Cl.
*G01V 3/26* (2006.01)
*E21B 49/00* (2006.01)

(52) U.S. Cl.
CPC ............... *G01V 3/26* (2013.01); *E21B 49/00* (2013.01)

(58) Field of Classification Search
CPC ... G01V 3/20–3/30; G01V 1/50; G01V 3/104; G01N 24/08; G01N 33/5061; G01R 33/288; G01R 27/2605; H01L 27/1052
USPC ........ 324/600, 676–683, 691–693, 702–710, 324/76.11, 76.77, 323, 360, 120, 355; 607/4, 5, 9, 55, 56, 57, 74, 34, 66, 607/119–123; 702/6, 7, 11–13
See application file for complete search history.

(56) References Cited

U.S. PATENT DOCUMENTS

| 7,066,282 B2 | 6/2006 | Chen et al. |
| 7,256,582 B2 | 8/2007 | Gorek et al. |
| 7,365,545 B2 | 4/2008 | Itskovich et al. |
| 7,483,793 B2 | 1/2009 | Wang et al. |

(Continued)

FOREIGN PATENT DOCUMENTS

CN 102678102 B 2/2015

OTHER PUBLICATIONS

Chen, Yong-Hua et al., "Inversion-Based Workflow for Quantitative Interpretation of the New-Generation Oil-Based Mud Resistivity Imager," SPWLA 55th Annual Logging Symposium, 24 pp. (May 18-22, 2014).

*Primary Examiner* — Melissa Koval
*Assistant Examiner* — Trung Nguyen
(74) *Attorney, Agent, or Firm* — Mossman, Kumar & Tyler, PC (57) ABSTRACT

Methods and apparatus configured to evaluate a volume of interest of an earth formation intersected by a borehole. Apparatus comprise a transceiver electrode on the tool body configured to provide electrical current to the earth formation; a return electrode configured to receive the electrical current returning from the earth formation; a multi-function electrode on the resistivity imager tool; and an electrical system configured to provide current measurements at the transceiver electrode. In the first operational mode, the electrical system maintains the tool body at a first electrical potential, and maintains the multi-function electrode and the transceiver electrode at a second electrical potential; and in the second operational mode, the electrical system maintains the tool body at the first electrical potential, maintains the multi-function electrode at the first electrical potential, and maintains the transceiver electrode at the second potential.

19 Claims, 5 Drawing Sheets

(56) References Cited

U.S. PATENT DOCUMENTS

| | | | |
|---|---|---|---|
| 7,612,567 B2 | 11/2009 | Itskovich et al. | |
| 8,129,994 B2 | 3/2012 | Wang | |
| 8,390,295 B2 | 3/2013 | Gorek et al. | |
| 8,763,695 B2 | 7/2014 | van Zanten | |
| 8,847,600 B2 * | 9/2014 | Signorelli | G01V 3/12 324/200 |
| 8,862,406 B2 | 10/2014 | Itskovich et al. | |
| 9,158,025 B2 | 10/2015 | Forgang | |
| 9,244,190 B2 * | 1/2016 | Ebihara | G01V 3/30 |
| 2011/0248716 A1 | 10/2011 | Folberth | |
| 2013/0234717 A1 | 9/2013 | Wang | |
| 2015/0012216 A1 | 1/2015 | Liu et al. | |
| 2015/0177407 A1 | 6/2015 | Hayman | |

* cited by examiner

RESISTIVITY IMAGER FOR CONDUCTIVE AND NON-CONDUCTIVE MUD

FIELD OF THE DISCLOSURE

This disclosure generally relates to exploration for hydrocarbons involving electrical investigations of a borehole penetrating an earth formation. More specifically, this disclosure relates to a universal resistivity imager that is equally adapted to conductive and substantially non-conductive muds.

BACKGROUND OF THE DISCLOSURE

Electrical earth borehole logging is well known and various devices and various techniques have been described for this purpose. Broadly speaking, there are two categories of devices used in electrical logging devices. In the first category, at least one transmitter such as a current electrode (e.g., a current source or sink) is used in conjunction with a diffuse return electrode (such as the tool body or mandrel of the logging tool). Conventionally, the electrode injecting current has been known as a "button." A measured electric current flows in a circuit that connects a current source to the transmitter, through the earth formation to the return electrode and back to the current source in the tool. In inductive measuring tools, a current flow is induced within the earth formation, such as, for example, by using an antenna within the measuring instrument. The magnitude of the induced current is detected using either the same antenna or a separate receiver antenna. The present disclosure belongs to the first category.

Electrical logging devices may be operable in one or more modes. In one mode, a constant current is maintained at a measuring electrode while a voltage (i.e., electric potential difference between said electrode and the tool's return) is measured; in another mode, the voltage of the measuring electrode is held constant and the current is measured. Ideally, if current is varied to maintain a constant voltage, the resultant current is inversely proportional to the resistivity of the earth formation being investigated. Conversely, if current is maintained constant through the circuit, ideally speaking the voltage of the measurement electrode is proportional to the resistivity of the earth formation being investigated. Ohm's law teaches that if both current and voltage vary, the resistivity of the earth formation is proportional to the ratio of the voltage to the current. These electrical measurements may be correlated with electrical properties of the borehole, such as resistivity parameters (e.g., a resistivity image of a volume of interest of the formation). Characterizing resistivity parameters of the formation facilitates optimization of further operations conducted in the formation, such as evaluation, drilling, or other exploration or completion operations of a typical oil or gas well.

Of course, the foregoing is a simplified and idealized description of physical relationships that are more complex in practical application. Those of ordinary skill in the art will appreciate that there are usually other variables to consider, for example the electrical characteristics of the instrumentation itself and the electrical characteristics of the environment under investigation. The prior art suggests innumerable approaches for addressing such non-idealized factors.

The borehole may be filled with a variety of downhole fluids including, for example, hydrocarbons and drilling fluids ("muds"). The composition of the drilling fluid may vary in accordance with formation operations being conducted, with example considerations including operating parameters, environmental conditions, and objectives associated with the operations. Drilling fluids may be generally characterized as water-based or oil-based.

Typically, water-based mud is electrically conductive, while oil-based mud is substantially non-conductive. It is known that oil-based drilling fluids may be used when drilling through water-soluble formations, and an increasing number of present day exploration prospects are believed to lie beneath water-soluble salt layers. The use of oil-based muds, which have a low electrical conductivity relative to water-based muds, makes the use of electrodes to inject electrical currents into a wellbore challenging.

SUMMARY OF THE DISCLOSURE

In aspects, the present disclosure is related to methods and apparatuses for evaluating a volume of interest of an earth formation intersected by a borehole, wherein the same apparatus may be used when the borehole is filled with conductive fluid as when the borehole is filled with substantially non-conductive fluid. Aspects of the present disclosure may include apparatus configured to evaluate a volume of interest of an earth formation intersected by a borehole. General embodiments may include an electrical logging apparatus configured for use with electrically conductive drilling fluid and non-conductive drilling fluid and using the same electrode arrangement for both modes by electronically switching between at least two modes of operation.

Apparatus embodiments may include a tool body configured to be conveyed in the borehole. The tool body may have thereon a transceiver electrode on the tool configured to provide electrical current to the earth formation; a return electrode configured to receive the electrical current returning from the earth formation; a multi-function electrode on the resistivity imager tool, the multi-function electrode configured to be switched between a guard mode and a return mode; and a shield electrode between the transceiver electrode and the multi-function electrode.

The apparatus may include an electrical system configured to provide current measurements at the transceiver electrode indicative of a resistivity parameter of the volume of interest. The current measurements may include current amplitude measurements and current phase measurements. The electrical system may be configured to be switched between a first operational mode and a second operational mode, wherein: in the first operational mode, the electrical system maintains the tool body at a first electrical potential, and maintains the multi-function electrode and the transceiver electrode at a second electrical potential different than the first potential; and in the second operational mode, the electrical system maintains the tool body at the first electrical potential, maintains the multi-function electrode at the first electrical potential, and maintains the transceiver electrode at the second potential different than the first potential.

The at least one processor may be configured to estimate complex impedance values from the current measurements and the corresponding second electrical potential in the first operational mode; estimate complex impedance values from the measured current and the corresponding second electrical potential in the second operational mode; and estimate a resistivity parameter of the volume of interest using the estimated complex impedance values. The tool body may be associated with a bottom hole assembly (BHA) and the transceiver electrode may be configured for rotation through a plurality of azimuthal orientations during measurement. The resistivity parameter may include a complex impedance of the volume of interest, and the at least one processor may be configured to estimate the complex impedance of the volume of interest at the plurality of azimuthal orientations while the BHA is performing drilling operations.

The at least one processor may be configured to estimate a complex impedance of the volume of interest from the current measurements and to provide a standoff image using an imaginary part of the complex impedance. The at least one processor may be configured to estimate a complex impedance of the volume of interest from the current measurements and to provide a resistivity image using a real part of the complex impedance.

In the first operational mode, the electrical system may provide current to the transceiver electrode at an operational frequency of less than 20 kHz; and, in the second operational mode, the electrical system may provide current to the transceiver electrode at an operational frequency of greater than 1 MHz. In the first and second operational modes the electrical system may maintain the shield electrode at substantially the second electrical potential.

Methods may include conveying a logging tool disposed on a carrier into the borehole, the logging tool including a tool body configured to be conveyed in the borehole; and using an electrical system to take current measurements at the transceiver electrode indicative of a resistivity parameter of the volume of interest.

The tool body may have thereon a transceiver electrode on the tool configured to provide electrical current to the earth formation; a return electrode configured to receive the electrical current returning from the earth formation; a multi-function electrode on the resistivity imager tool, the multi-function electrode configured to be switched between a guard mode and a return mode; and a shield electrode between the transceiver electrode and the multi-function electrode. The electrical system may be configured to be switched between a first operational mode and a second operational mode, wherein: in the first operational mode, the electrical system maintains a tool body at a first electrical potential, maintains the multi-function electrode and the transceiver electrode at a second electrical potential different than the first potential; and in the second operational mode, the electrical system maintains the tool body at the first electrical potential, maintains the multi-function electrode at the first electrical potential, and maintains the transceiver electrode at a second potential different than the first potential. The current measurements may comprise current amplitude measurements and current phase measurements.

Methods may include using at least one processor to: estimate complex impedance values from the current measurements and the corresponding first electrical potential in the first operational mode; estimate complex impedance values from the measured current and the corresponding fourth electrical potential in the second operational mode; and estimate a resistivity parameter of the volume of interest using the estimated complex impedance values.

Methods may include taking the current measurements in a plurality of azimuthal orientations by rotation of the transceiver electrode around a central axis of the tool body and taking the current measurements during the rotation. The resistivity parameter may comprise a complex impedance of the volume of interest. The method may comprise using the at least one processor to estimate the complex impedance of the volume of interest at the plurality of azimuthal orientations while the BH is performing drilling operations.

Methods may include using the electrical system to provide current to the transceiver electrode at an operational frequency determined responsive to a selection of the operational mode from among the first operational mode and the second operation mode, the operational frequency being of at least one of i) less than 20 kHz; and ii) greater than 1 MHz. Methods may include using the electrical system to maintain the shield electrode at the second electrical potential in both operational modes. Methods may include using the at least one processor to estimate a complex impedance of the volume of interest from the current measurements and to provide a standoff image using an imaginary part of the complex impedance. Methods may include using the at least one processor to estimate a complex impedance of the volume of interest from the current measurements and to provide a resistivity image using a real part of the complex impedance. Methods may include injecting an electric current into the volume of interest of the earth formation.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

This disclosure generally relates to methods and apparatuses for evaluating a volume of interest of an earth formation intersected by a borehole, wherein the same apparatus may be used when the borehole is filled with conductive fluid as when the borehole is filled with substantially non-conductive fluid.

It is well understood by those of skill in the art that oil-based drilling fluid and water-based drilling fluid are each suitable for particular downhole applications. With conventional logging tools, those tools configured for use with one type of drilling fluid exhibit drastically reduced effectiveness when used with the other type of fluid. This is exacerbated in the field of resistivity imaging, and particularly in imaging characterized as measurement-while-drilling ('MWD'), which is the most demanding of logging operations. Existing MWD imagers work only in water-based mud. Having a single imager which works in both environments is highly desirable.

It has been understood by those of skill in the art that, to be used with non-conductive drilling fluid, a tool may use a pair of spaced potential electrodes between a current injection electrode (e.g., "a button") and a return electrode, often referred to as a "four-electrode" arrangement. A high-frequency current between the button and the return electrode passes through the formation. The voltage drop ('potential difference') between the potential electrodes is used in calculating formation resistivity.

More recently, to bridge the gap in the art, a tool has been disclosed which combines a two-electrode current-measuring configuration suitable for conductive drilling fluids, and a four-electrode configuration (e.g., a pair electrodes used for current injection and another pair of voltage-measuring electrodes) suitable for non-conductive drilling fluids.

Aspects of the present disclosure include an electrical logging apparatus configured for use with electrically conductive drilling fluid and non-conductive drilling fluid and using the same two-electrode physical arrangement for both modes by electronically switching between at least two modes of operation. Thus additional voltage-drop electrodes are avoided. Two modes of operation may represent a mode suitable for measurements of a parameter of interest in a conductive drilling fluid and a non-conductive drilling fluid, respectively.

In particular, for a given voltage source of the tool the image of formation resistivity is based on measurement of the electrical current injected into the formation from a first electrode ("button") and return of this current to the second electrode (e.g., a return electrode) with the total area substantially larger than the area of first electrode. The return electrode may be a diffuse return electrode and may comprise some or all of the tool body. Using a two-electrode arrangement in place of the four-electrode arrangement for non-conductive imaging provides more accurate results and higher resolution especially for formation features at a relatively large dip angle with respect to the borehole axis and may decrease costs and prolong tool life. Embodiments of the present disclosure require no mechanical changes to alternate between conductive drilling fluid and non-conductive drilling fluid measurement modes.

The novel methods of the present disclosure are achieved by an adaptation and extension of a water-based mud imaging system to the conditions of the oil-based mud environment through the use of circuitry which changes the electrical function of one or more components on the sensor array in the context of the electrical measurement circuit. Synchronization of the voltage source with a processor (e.g., an on-board downhole processor) allows for a phase-sensitive analysis of injected electrical current and, in turn, estimation of an effective complex impedance in front of the button associated with the volume of interest in both modes.

The non-conductive ("oil-based") fluid mode of operation may employ high frequency electronics operating in the range between 1 and 100 MHz, while the conductive ("water-based") fluid mode of operation may employ a frequency below 20 kHz. In the case of conductive mud the image is obtained by measuring an impedance in front of the button electrode, while in case of non-conductive mud the image is obtained using the real component of the button's complex impedance. In the non-conductive mode, the imaginary part of the complex impedance in front of the button is used to characterize a condition of the borehole wall as well as a position of the imager in the wellbore. A dedicated electrical system switch may control an operational mode by switching the imaging tool to either operational mode.

Figure 1A:
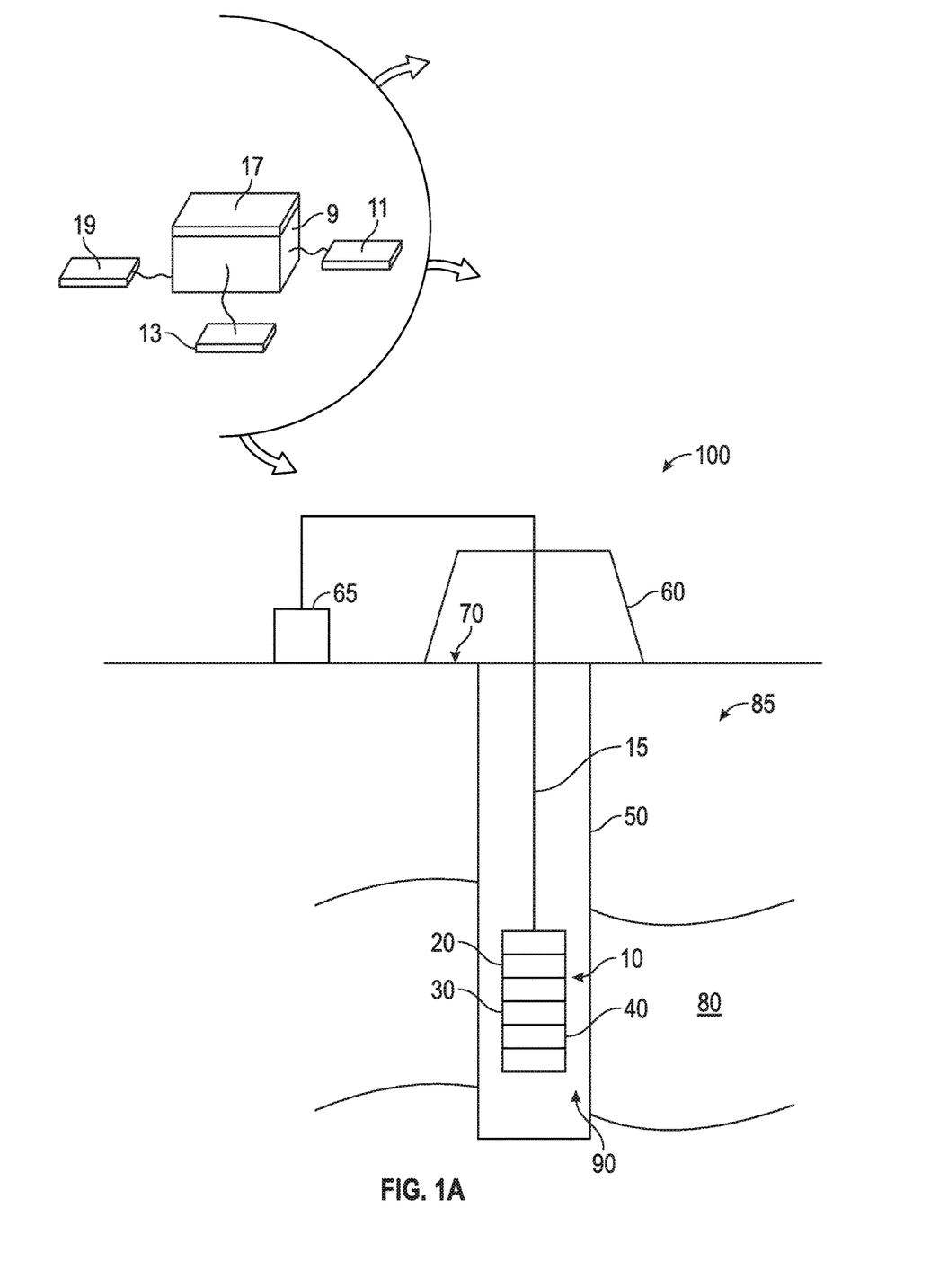
FIG. 1A schematically illustrates a resistivity imaging system having a downhole resistivity tool in accordance with embodiments of the present disclosure.

FIG. 1A schematically illustrates a resistivity imaging system 100 having a downhole tool 10 configured to acquire information for producing a resistivity image of the earth formation 80 or another parameter of interest of a formation 80 using at least one electrical sensor 40. The system 100 may include a conventional derrick 60 erected on a derrick floor 70. A conveyance device (carrier 15) which may be rigid or non-rigid, may be configured to convey the downhole tool 10 into wellbore 50 in proximity to a volume of interest 80 of an earth formation 85. The carrier 15 may be a drill string, coiled tubing, a slickline, an e-line, a wireline, etc. Downhole tool 10 may be coupled or combined with additional tools e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable). The carrier 15 may include a bottom hole assembly, which may include a drilling motor for rotating a drill bit.

Drilling fluid ('mud') 90 may be present between the formation 85 and the downhole tool 10, such that drilling fluid 90 affects the value of resistivity measurements obtained from the formation. The tool 10 may be in contact with earth formation 85 when performing various measurement operations. The point of contact may be sensor(s) 40 in contact with the earth formation 85. Sensor(s) 40 may be retractable (e.g., mounted on an extending arm), and may be in contact with the earth formation 85 at the borehole wall or with downhole fluid 90.

A surface control system 65 receives signals from downhole sensor(s) 40 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 20 at a suitable location on downhole tool 10. The surface control system 65 may process data relating to the operations and data from the sensors 40, and may control one or more downhole operations performed by system 100.

In one embodiment, electronics 30 associated with sensors 40 may be configured to record and/or process the information obtained. Certain embodiments of the present disclosure may be implemented with a hardware environment that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Figure 2A:
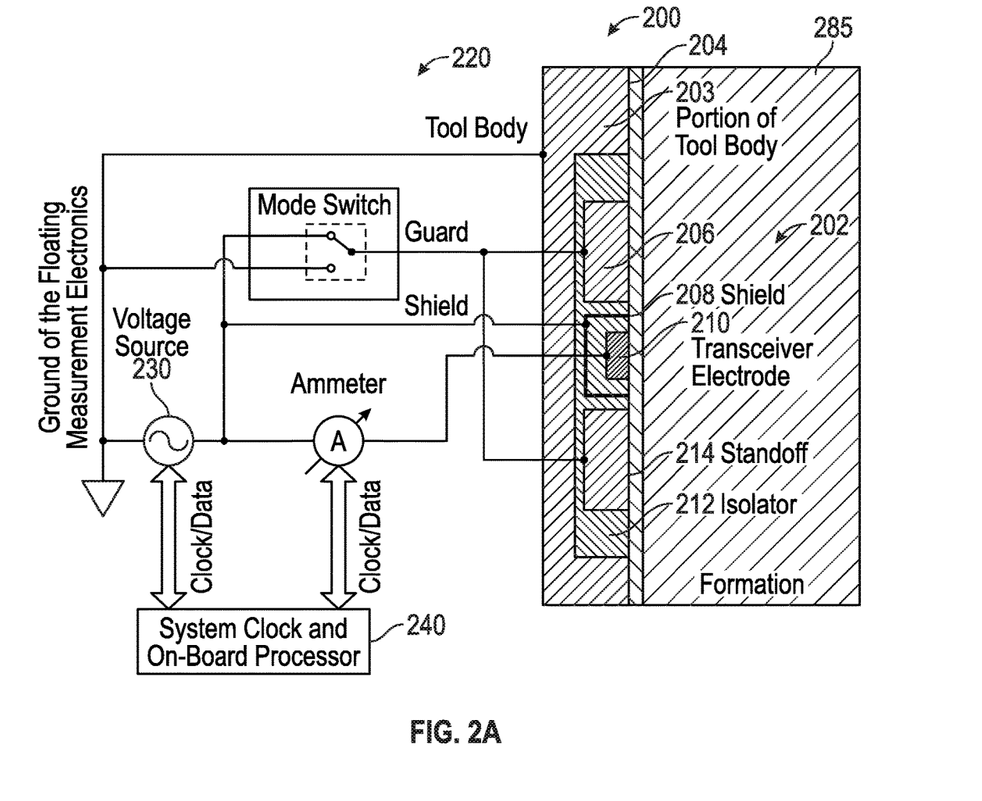
FIG. 2A shows a schematic diagram illustrating a universal downhole imaging tool in accordance with embodiments of the present disclosure while selected to a first mode of operation.

In one embodiment, electronics associated with the detectors (described in further detail below with respect to FIG. 2) may be configured to take measurements at a plurality of azimuthal orientations as the tool moves along the longitudinal axis of the borehole ('axially') using at least one sensor 40. These measurements may be substantially continuous, which may be defined as being repeated at very small increments of depth and azimuth, such that the resulting information has sufficient scope and resolution to provide an image of borehole parameters (e.g., electrical properties of the formation at the borehole.

In other embodiments, electronics may be located elsewhere (e.g., at the surface, or remotely). To perform the treatments during a single trip, the tool may use a high bandwidth transmission to transmit the information acquired by detectors 20, 30 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

One point of novelty of the system illustrated in FIG. 1A is that the surface control system 65 and/or the downhole control system 20 are configured to perform certain methods (discussed below) that are not in the prior art. A surface control system or downhole control system may be configured to control the tool described above and any incorporated sensors and to estimate a parameter of interest according to methods described herein.

Figure 1B:
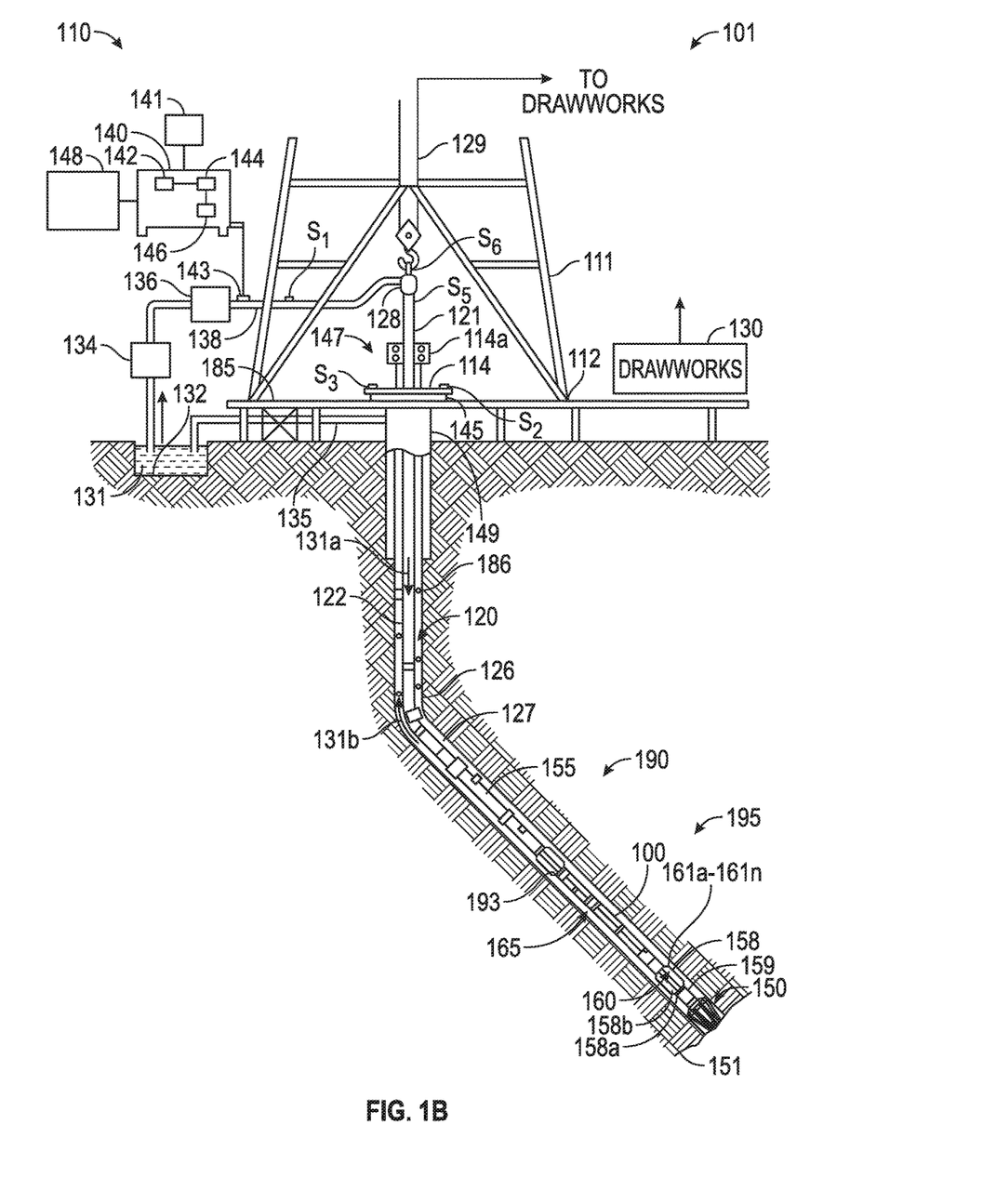
FIG. 1B is a schematic diagram of an exemplary drilling system according to embodiments of the disclosure.

Aspects of the present disclosure are subject to application in various different embodiments. In some general embodiments, carrier 15 is implemented as a tool string of a drilling system, and electrical measurements taken in the borehole may be characterized as "logging-while-drilling" (LWD) or "measurement-while-drilling" (MWD) operations. FIG. 1B shows an exemplary embodiment of a system for evaluation of an earth formation using measurements from a universal downhole electrical measurement tool. The system 101 includes a carrier 111 that is shown disposed in a wellbore or borehole 126 that penetrates at least one earth formation 195. The system 101 also includes a tool 110 configured for taking electromagnetic measurements in the borehole.

As described herein, "borehole" or "wellbore" refers to a single hole that makes up all or part of a drilled well. Depending on the configuration, the system 101 may be used during drilling and/or after the wellbore 112 has been formed. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

FIG. 1B shows a drill string 120 including a bottomhole assembly (BHA) 190 conveyed in the borehole 126 as the carrier. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

It should be understood that embodiments of the present disclosure are well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc) refer to the direction of travel along the borehole either toward or away from the surface, with the upward direction being toward the surface and the downward direction being away from the surface.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a discharger 136 and the fluid line 138. The drilling fluid 131*a* from the drilling tubular discharges at the borehole bottom 151 through openings in the drill bit 150. The returning drilling fluid 131*b* circulates uphole through the annular space 127 between the drill string 120 and the borehole 126 and returns to the mud pit 132 via a return line 135 and drill cutting screen 185 that removes the drill cuttings 186 from the returning drilling fluid 131*b*. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

Well control system 147 is placed at the top end of the borehole 126. The well control system 147 includes a surface blow-out-preventer (BOP) stack 115 and a surface choke 149 in communication with a wellbore annulus 127. The surface choke 149 can control the flow of fluid out of the borehole 126 to provide a back pressure as needed to control the well.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays drilling parameters and other parameters of interest related to the formation and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, and data received from downhole; and may control one or more operations of the downhole and surface devices. The data may be transmitted in analog or digital form.

The BHA 190 may include a tool 110 configured for performing electromagnetic (EM) measurements. The BHA 190 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 150. For convenience, all such sensors are generally denoted herein by numeral 165. The BHA 190 may further include a variety of other sensors and devices 159 for determining one or more properties of the BHA 190, such as vibration, bending moment, acceleration, oscillations, whirl, stick-slip, weight-on-bit, fluid flow rate, pressure, temperature, rate of penetration, azimuth, tool face, drill bit rotation, etc.

The BHA 190 may include a steering apparatus or tool 158 for steering the drill bit 50 along a desired drilling path. In one aspect, the steering apparatus may include a steering unit 160, having a number of force application members 161*a*-161*n*. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158*a* to orient the bent sub in the wellbore and the second steering device 158*b* to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 120 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control of system 101 and processing of information, such as information from the sensors. The non-transitory computer-readable medium may include one or more ROMs, EPROMs, EAROMs, EEPROMs, flash memories, RAMs, hard drives and/or optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate the formation.

Surface processor 142 or downhole processor 193 may also be configured to control steering apparatus 158, mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling parameters, steering the drillbit (e.g., geosteering), and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 142, downhole processor 193, or other processors (e.g. remote processors) may be configured to operate the EM tool 101 to excite and measure EM signals.

The system 101 may include any number of downhole tools for various processes including formation drilling, geosteering, and formation evaluation (FE) for making electrical measurements versus depth and/or time of one or more physical properties in or around a borehole, including a volume of interest of the formation intersected by the borehole. The tool 110 may be included in or embodied as a BHA, drillstring component or other suitable carrier.

While a drill string 120 is shown as a conveyance device for tool 101, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 101 may include a bottomhole assembly and/or sensors and equipment for implementation of embodiments of the present disclosure on either a drill string or a wireline.

In some embodiments, a sensor array configured for electrical downhole measurements may rotate with a rotating bottom hole assembly or may be independently rotated about the carrier. Thus, an azimuthal image of the borehole may be produced in some implementations of the tool by rotating the transceiver through a plurality of azimuthal orientations. In one example, the transceiver may be mounted in a cylindrical multi-function electrode.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Various types of electrical downhole parameters may be determined using measurements in accordance with the present disclosure and in evaluating the formation in accordance with embodiments disclosed herein.

As described above, aspects of the present disclosure include a downhole electrical measurement system (configured for, e.g., resistivity imaging of a subterranean borehole) including a tool having an electrical system configured to be switched between a first operational mode and a second operational mode. The first operational mode is more suitable for measurements in a conductive downhole fluid, and the second operational mode is more suitable for measurements in a non-conductive downhole fluid. The selection of an operational mode results in a selection of one of two different measurement circuits, and each measurement circuit is configured for electrical measurements in a downhole fluid of the respective type. The selection may be performed automatically downhole or via commands from the surface, such as, for example, as initiated by a remote operator.

Figure 2B:
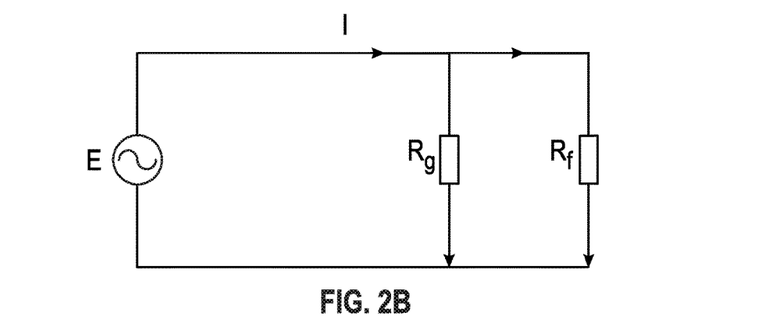
FIG. 2B shows a modeled equivalent circuit diagram of a universal downhole imaging tool in a borehole filled with conductive downhole fluid in accordance with embodiments of the present disclosure while selected to a first mode of operation.

Example devices for downhole electrical measurements according to embodiments of the present invention are described with reference to FIGS. 2A & 2B and 3A & 3B. FIGS. 2A & 2B illustrate a measurement tool according to the present invention while in the first operation mode. 3A & 3B illustrate a measurement tool according to the present invention while in the second operation mode. The differences between FIGS. 2A & 2B and 3A & 3B reflect the selected operational mode.

FIG. 2A shows a schematic diagram illustrating a universal downhole imaging tool in accordance with embodiments of the present disclosure while selected to a first mode of operation. The universal downhole imaging tool 200 may be used as part of a borehole sidewall imager system. Tool 200 includes a tool body (e.g., mandrel) 204 configured to be conveyed in the borehole and at least one resistivity sensor assembly 202. The at least one resistivity sensor assembly 202 may include a transceiver electrode 210 on the tool configured to provide electrical current to the earth formation and a return electrode (here, implemented as a portion of tool body 203) configured to receive the electrical current returning from the earth formation. The tool incorporates a wide-band electronics common for both modes while selection of operating frequency depends on the type of the drilling fluid in the well. When the tool operates in non-conductive drilling fluid this operating frequency could be preferably selected between 1 MHz and 100 MHz; instead, for measurements in the wells with conductive drilling fluids this frequency may be below 20 kHz.

The transceiver electrode 210 (or "button") is used for injecting current into the formation and for sensing with its geometry determining the measurement result. That is, the current measurement is dependent upon the button geometry (e.g., dimensions), and thus estimation of the parameter of interest may use a model accounting for the button geometry. In particular embodiments, more than one transceiver electrode 210 may be on an array 202, and more than one array 202 may be employed with a tool. Transceiver and/or arrays of transceivers may be deployed axially or azimuthally around the circumference of the tool.

In those tools having a plurality of transceiver electrodes, transceivers having a variety of respective geometries may be employed. The particular dimensions and number of transceivers may be application-specific, and may be tailored to the borehole environment. For example, additional transceiver electrodes 210 of different sizes may be used to increase immunity of the imager to the standoff. Measurements from particular transceivers may be selected and/or combined for use in estimating a parameter of interest in dependence upon the imaging environment. For example, in favorable conditions an image may be obtained from measurements using relatively smaller buttons, while in a rugose borehole or where a large standoff exists, the image may be obtained using measurements from transceivers of relatively larger size.

In the first mode of operation, a resistivity image of the borehole may be obtained by measuring impedance in front of the transceiver electrode 210 at frequencies below 20 KHz. An imaginary part of the transceiver impedance may used to characterize the borehole wall and the imager's position in the well.

In operation, the voltage produced by the voltage source 230 may be applied between the transceiver electrode 210 and the return electrode 203. The current/through the transceiver electrode 210 is measured to estimate impedance. Note that/may have a phase different from the phase of signal from voltage source 230 and thus be a complex value, such that the impedance (Ze) has both active and reactive components. In some embodiments, the system 100 (e.g., tool 10) may include control circuitry (not shown) and be configured to cause the power source (voltage source 230) to send a plurality of measurement signals as a plurality of frequencies that may be imparted to the formation 285. In some embodiments, control circuitry may reside uphole from tool 10, or at the surface. In some embodiments, tool 10 may include or be operably coupled to imaging circuitry or other processors configured to generate a resistivity image of a volume of interest of the formation 285 from a selected plurality of measured impedance values.

The at least one resistivity sensor assembly further includes a multi-function electrode 206 configured to be switched between a guard mode and a return mode, a shield electrode 208 between the transceiver electrode 210 and the multi-function electrode 206, and an electrical system 220. The conductive shield electrode 208 may reduce stray coupling between the transceiver electrode 210 and the tool body 204, as will be described in greater detail below. The electrical system 220 is configured to provide current measurements at the transceiver electrode indicative of a resistivity parameter of the volume of interest and is configured to be switched between a first operational mode and a second operational mode.

In the first operational mode, focusing is employed to force injection of the current into the formation, and the multi-function electrode is employed in a guard mode. The electrical system maintains the at least one transceiver electrode 210 at a first electrical potential, the multi-function electrode at the first electrical potential, and the tool body at a second potential different than the first potential. By maintaining the transceiver 210 and the multi-function (guard) electrode under the same potential in the first mode, focusing conditions are provided for the injected current to flow in a radial direction from the transceiver through the gap into the formation.

Effectively, the tool includes a transceiver 210 mounted on an electrically conductive guard (electrode 206) and galvanically separated by isolator 212 from this guard. Isolator 212 may be comprised at least in part of an insulating material or a physical gap. The guard, in its turn, is separated from the main part of the steel mandrel by isolator 212.

There may also be a standoff 214 between the electrodes and the borehole wall 216, filled with the conductive downhole fluid (e.g., water-based mud). The current is injected into the formation by using a low-frequency voltage (e.g., 1-20 kHz) provided by the voltage source V and returned from the formation through the tool body 204 (which may be, for example, a steel mandrel), functioning as a return electrode.

Since the water-based mud is usually more conductive than the formation, the injected current flows through the mud to the formation (and then to the return) and only an insignificant portion of the current leaks into the formation. The amount of leakage current increases with the conductivity of the formation and decreases as the formation becomes more resistive. As described above, equipotentiality of the guard electrode provides focusing conditions for the current to flow in a radial direction from the transceiver through the gap into the formation. The stronger the focusing is, the narrower the current tubes extended from the button to the mandrel, as well as the larger the amount of the current flowing into the formation.

Aspects of the disclosure may use a vector impedance analyzer system to make impedance measurements, including amplitude measurements and phase measurements. The estimated impedances may always be complex values. The real part of the complex value may be interpreted as resistance while the imaginary part of the complex value may be interpreted as reactance. These parts reflect different energy perturbations; however, in many DC or relatively low frequency applications reactance may be either substantially absent or negligible, and thus ignored.

A common system clock 240 may be employed as a global time\phase reference, and phases of source(s) and load signal(s) may be determined with respect to this global parameter. The rest of signal processing such as conditioning, digitization, routing, application of transforms, filtering, corrections, etc., may be based on instrument solutions as well known to those of skill in the art.

FIG. 2B shows a modeled equivalent circuit diagram of a universal downhole imaging tool in a borehole filled with conductive downhole fluid in accordance with embodiments of the present disclosure while selected to a first mode of operation. The model assumes negligible capacitive effects (due to dielectric properties of the mud fluid) and purely resistive values for all impedances in the circuitry. FIG. 2B shows that the current in the circuit depends on the gap resistance $R_g$ and the resistivity of the formation $R_f$. In turn, the gap resistance $R_g$ is a function of the mud resistivity, the standoff between the button and the borehole wall, and the guard length. Increases in the modeled resistor $R_g$ (e.g., from an increase of the return electrode size or standoff reduction) result in an increase of the amount of current leaking into the formation, and thus an increase in the sensitivity of the imager to the formation resistivity.

If V is the applied voltage and $R_e = R_g R_f / (R_g + R_f)$ is the effective resistance, then the current in the circuit is $$I = \frac{V}{R_e} = \frac{V(R_g + R_f)}{R_g R_f}.$$

Since water-based mud is quite conductive, the majority of the current crosses the gap to the formation, although a small portion leaks out. The larger the conductivity of the formation, the more current reaches the formation providing for a better image. In the case when there is no standoff between button and formation, the condition $R_g \gg R_f$ holds, and the measured current follows the conductivity of the formation:

$$I = \frac{V}{R_e} \approx \frac{V}{R_f};$$

and, thus, effective resistivity follows resistivity of the formation:

$$R_e \approx R_f = \frac{V}{I}.$$

The degree of focusing directly depends on the dimensions of the multipurpose electrode 206 and the isolator 212, and more particularly the axial length of each. Simulations of the impedances corresponding to different axial lengths of guard electrode suggest that when the axial length of the isolator is 40 cm and longer, focusing conditions are met and the imager can operate even at standoff as large as 0.5 in.

Figure 3A:
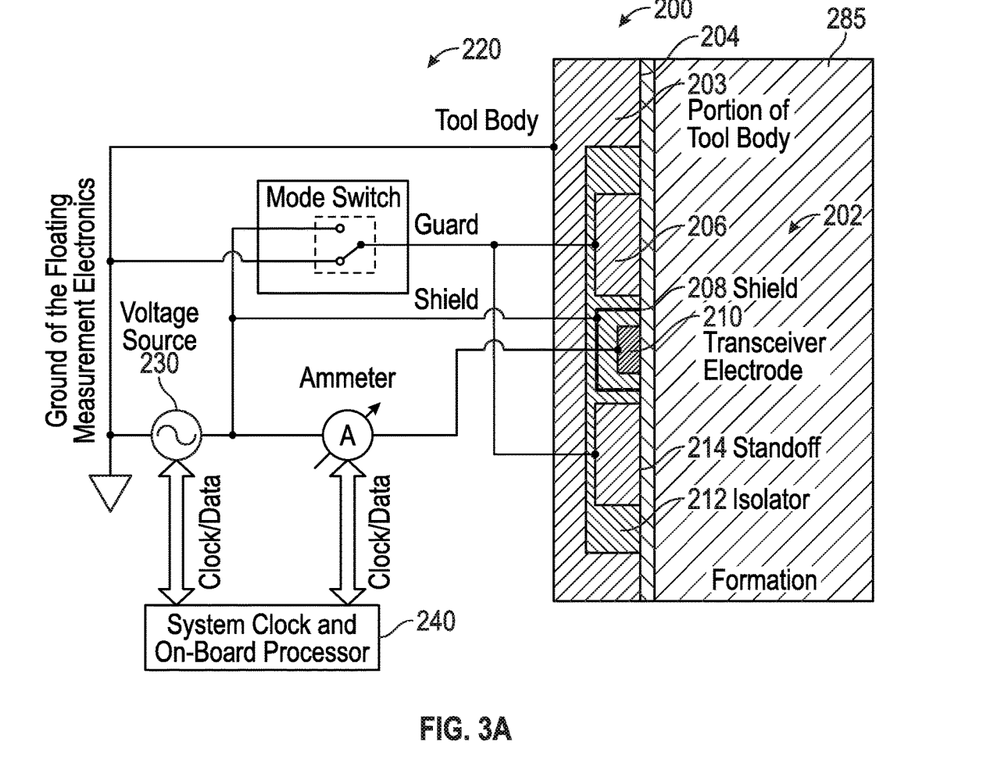
FIG. 3A shows a schematic diagram illustrating a universal downhole imaging tool in accordance with embodiments of the present disclosure while selected to a second mode of operation.

FIG. 3A shows a schematic diagram illustrating a universal downhole imaging tool in accordance with embodiments of the present disclosure while selected to a second mode of operation. In the second mode of operation, a resistivity image of the borehole may be obtained using a real component of a measured impedance in front of the transceiver electrode 210 at frequencies around 1 MHz or above. The most critical operating parameter relating to the tool is the standoff, which affects transceiver impedance. The increased frequency of the second operational mode reduces the imaginary part of the impedance and allows current to flow through the gap between the transceiver and the borehole wall. An imaginary part of the transceiver impedance may used to characterize a condition of the borehole wall and position the imager in the well. In contradistinction with conductive drilling fluid, non-conductive drilling fluid may not allow effective injection through the use of focusing. Switching from the first operational mode (water-based mud) to the second operational mode (oil-based mud) resolves this issue by changing characteristics of the multipurpose electrode. For example, the change in operational mode may result in re-connection of multipurpose electrode to maintain a different potential with respect to the transceiver 210. With voltage source having two voltage ports with one of them set as a return, a first connection corresponding to the first tool operational mode is an arrangement wherein the tool body 204 is at the first potential (first port) while the multipurpose electrode and shield linked to transceiver 210 are all under some second potential (a second port). Another connection corresponding to the second tool operational mode results in an alternative arrangement wherein the tool body and multipurpose electrode are both set at the first potential and serve as return while the transceiver 210 and shield remain at a second potential (second port). For those skilled in the art it could be clear that in many practical cases the tool body also serves as a common for the tool electronics and is often referred to as a "ground".

Since the water-based mud is usually more conductive than the formation, the injected current flows through the mud to the formation (and then to the return) and only an insignificant portion of the current leaks into the formation. The amount of leakage current increases with the conductivity of the formation and decreases as the formation becomes more resistive. As described above, equipotentiality of the guard and transceiver electrodes provides focusing conditions for the current to flow in a radial direction from the transceiver through the gap into the formation. The stronger the focusing is, the narrower the current tubes extended from the button to the mandrel, as well as the larger the amount of the current flowing into the formation.

Figure 3B:
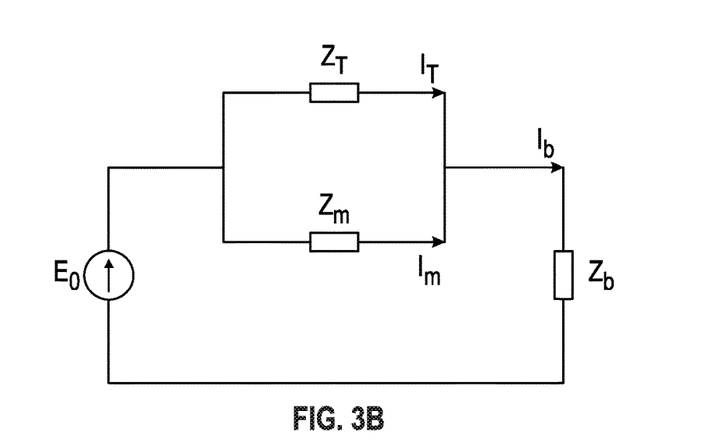
FIG. 3B shows a modeled equivalent circuit diagram of a universal downhole imaging tool in a borehole filled with non-conductive downhole fluid in accordance embodiments of the present disclosure while selected to a second mode of operation.

FIG. 3B shows a modeled equivalent circuit diagram of a universal downhole imaging tool in a borehole filled with non-conductive downhole fluid in accordance embodiments of the present disclosure while selected to a second mode of operation. One desirable effect of the configuration in accordance with FIG. 3A is the relatively small effect of the current leakage through the formation to the mandrel.

Referring to FIG. 3B, $E_0$ is the applied voltage. The current through the button $I_b$ may be expressed as:

$$I_b = \frac{E_0}{Z_b + \frac{Z_m Z_T}{Z_m + Z_T}} \quad (1)$$

By definition, the impedances of the 'transmitter' (e.g., the return path comprising the multipurpose electrode 206 set in return mode) ($Z_T$), the transceiver electrode ($Z_b$), and the tool body 204 are calculated as the following:

$$Z_T = \frac{1}{j\omega C_T} = R_T - jX_T \quad (2)$$

$$Z_b = R_F + \frac{1}{j\omega C_b} = R_F - jX_b$$

$$Z_m = R_m + \frac{1}{j\omega C_m} = R_m - jX_m$$

and for the measured impedance Z may become:

$$Z = Z_b + \frac{Z_m Z_T}{Z_m + Z_T} \quad (3)$$

From (1) and (2), after simple algebraic manipulations, the real and imaginary parts of the impedance Z may be derived:

$$Re(Z) = R_F + \frac{(R_m R_T + X_m X_T)(R_m + R_T) + (X_m R_T + R_m X_T)(X_m + X_T)}{(R_m + R_T)^2 + (X_m + X_T)^2} \quad (4)$$

$$Im(Z) = -jX_b - \frac{(X_m R_T + R_m X_T)(R_m + R_T) + (R_m R_T + X_m X_T)(X_m + X_T)}{(R_m + R_T)^2 + (X_m + X_T)^2} \quad (5)$$

Assuming $X_m \ll X_T$, $R_m \ll R_T$ and $R_T \ll X_T$, then $$Re(Z) \approx R_F + R_m \quad (6)$$

$$Im(Z) \approx -j(X_b + X_m) \quad (7)$$

In case when $X_m \ll X_T$ and $R_m \ll R_T$ for Re(Z) and Im(Z) we have $$Re(Z) \approx R_F + R_T \quad (8)$$

$$Im(Z) \approx -j(X_b + X_T) \quad (9)$$

Using equations (8), it will be understood, to one of skill in the art and having benefit of the present disclosure, that, for a small return impedance $R_T$, the real part of the impedance does not depend on the standoff and substantially follows only the formation resistivity.

When using the tool body 204 (or pad body) in place of return electrodes all current emitted from the transceiver electrode may return through the body. The conductive shield 208 mentioned above is a biasing element which may prevent partial leak of the emitted current to the mandrel or other tool body from stray coupling.

At least one transceiver electrode 210 may be electrically connected to a power source (voltage or current) through a first input and an output of a converter. In some embodiments, the converter 330 may be a current-to-voltage converter. Current imparted from the at least one transceiver electrode 210 into the formation 285 may return through tool body 204. The shield electrode 208 may be disposed between the transceiver electrode 210 and the tool body 204. The shield may be formed at least in part of a conductive material such that the shield reduces or prevents the passage of electric current between the transceiver electrode 210 and the tool body 204. Examples could be one of: (i) a solid form and (ii) a mesh. The shield electrode 208 may be biased through coupling with a power supply (e.g., at the voltage of the second input of the converter), including, in some cases, at a voltage other than the voltage of the second input of converter. The shield electrode 208 may be biased at a voltage identical to the voltage of the transceiver electrode 210.

While electric current is imparted into the formation 285 through the transceiver electrode 210, a voltage may be impressed on the shield electrode by the electrical system 220. In some instances, in operation, using the shield is carried out by applying a bias voltage to the shield electrode using a power source, the bias voltage being the same as a voltage of at least one transceiver electrode; and reducing coupling between the at least one transceiver electrode and at least one return electrode while the logging tool is in the borehole using the shield electrode between the at least one transceiver electrode and the at least one return electrode. The at least one transceiver electrode may be electrically coupled in circuit with the power source and the earth formation to inject current into a drilling fluid and the earth formation.

In some embodiments, the resistivity sensor assembly may comprise a resistivity array, which may include one or more pads. These pads may be secured to extendable arms which may be conductive, partially conductive, or non-conductive. Hydraulic or spring-loaded caliper-arm actuators (not shown) of any well-known type may be used to extend the pads and their electrodes into position (e.g., in proximity to, or urged against the borehole sidewall) for resistivity measurements. In some embodiments, a single pad (or in other embodiments, the mandrel) may include an array of button electrodes. The array may be a linear array oriented along a longitudinal axis of the tool, a linear array oriented along a transverse axis of the tool, or a two dimensional array. Any of these configurations may be used to provide an image of a resistivity property of the earth formation.

Those of ordinary skill in the art and having benefit of the present disclosure will recognize that the systems and tools described herein may optionally include other functional components, as described, for example, in U.S. Pat. No. 7,365,545 to Itskovich et al., U.S. Pat. No. 9,158,025 to Forgang, U.S. Pat. No. 8,862,406 to Itskovich et al., U.S. Pat. No. 7,256,582 to Gorek et al., U.S. Pat. No. 8,390,295 to Gorek et al., U.S. Pat. No. 7,612,567 to Itskovich et al., which are each hereby incorporated by reference herein in their entirety. Among these are electronics modules located at suitable locations on or within the tool, as would be understood by those or ordinary skill in the art. Various tool components may be mounted on a carrier in a conventional and well-known manner. One portion of the tool may contain a telemetry module (not shown) for sampling, digitizing and transmission of data samples from the various tool components uphole to surface electronics in a conventional arrangement.

Figure 4A:
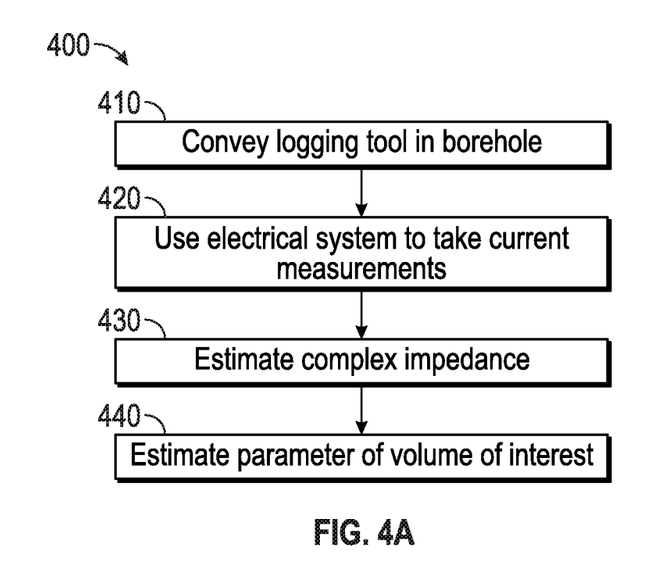
FIG. 4A illustrates a method of evaluating a volume of interest of an earth formation intersected by a borehole in accordance with embodiment of the present disclosure.

FIG. 4A illustrates a method of evaluating a volume of interest of an earth formation intersected by a borehole in accordance with embodiment of the present disclosure. Beginning method 400, step 410 includes conveying a logging tool disposed on a carrier in the borehole. The logging tool includes a tool body configured to be conveyed in the borehole. The tool body has thereon: a transceiver electrode on the tool configured to provide electrical current to the earth formation; a return electrode configured to receive the electrical current returning from the earth formation; a multi-function electrode on the resistivity imager tool, the multi-function electrode configured to be switched between a guard mode and a return mode; and a shield electrode between the transceiver electrode and the multi-function electrode. Step 420 comprises using an electrical system to take current measurements at the transceiver electrode indicative of a resistivity parameter of the volume of interest. The electrical system is configured to be switched between a first operational mode and a second operational mode. Thus step 420 may include selecting the appropriate mode. In the first operational mode, the electrical system maintains a transceiver electrode at a first electrical potential, maintains the multi-function electrode at the first electrical potential, and maintains the tool body at a second potential different than the first potential; and in the second operational mode, the electrical system maintains the tool body at a third electrical potential, maintains the multi-function electrode at the third electrical potential, and maintains the transceiver electrode at a fourth potential different than the third potential. The method may include using the electrical system to provide current to the transceiver electrode at an operational frequency determined responsive to a selection of the operational mode from among the first operational mode and the second operation mode, the operational frequency being of at least one of i) less than 20 kHz; and ii) greater than 1 MHz. The method may include using the electrical system to maintain the shield electrode at an electrical potential determined responsive to a selection of the operational mode from among the first operational mode and the second operation mode, the electrical potential being of at least one of i) the first electrical potential; and ii) the fourth electrical potential.

Using the electrical system to take measurements may include taking the current measurements in a plurality of azimuthal orientations by rotation of the transceiver electrode around a central axis of the tool body and taking the current measurements during the rotation. In some implementations, the tool incorporated into the BHA of a drill string, and the method may include using the at least one processor to estimate the complex impedance of the volume of interest at the plurality of azimuthal orientations while the BHA is performing drilling operations.

Step 430 includes using at least one processor to perform at least one of: estimate complex impedance values from the current measurements and the corresponding first electrical potential in the first operational mode; and estimate complex impedance values from the measured current and the corresponding fourth electrical potential in the second operational mode.

Step 440 comprises using the at least one processor to estimate a resistivity parameter of the volume of interest using the estimated complex impedance values. In some embodiments, a resistivity image may be produced using the measurements. Method 400 may be performed using multiple measure electrodes sequentially or simultaneously.

For example, the method 400 may include using the at least one processor to estimate a complex impedance of the volume of interest from the current measurements and to provide a standoff image using an imaginary part of the complex impedance. The method 400 may also include using the at least one processor to estimate a complex impedance of the volume of interest from the current measurements and to provide a resistivity image using a real part of the complex impedance.

Figure 4B:
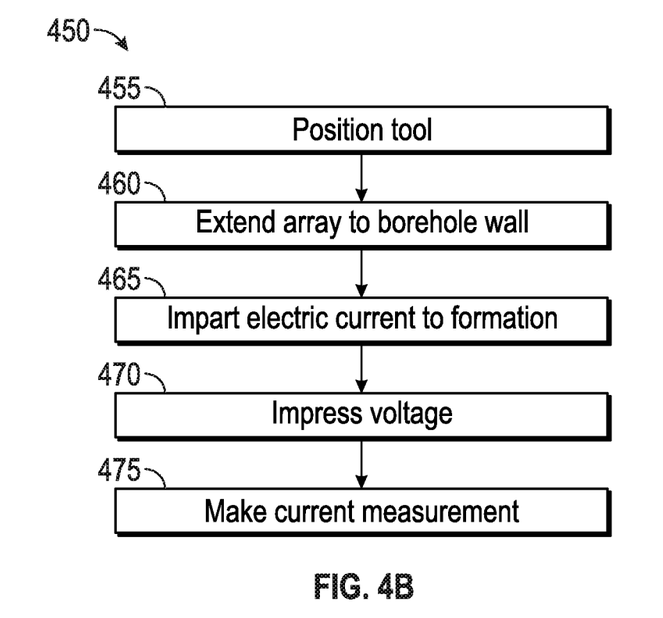
FIG. 4B shows a method for taking measurements in accordance with embodiments of the present disclosure.

FIG. 4B shows a method for taking measurements in accordance with embodiments of the present disclosure. In method 450, an imaging tool is positioned within a borehole adjacent to an earth formation in step 455. Then, in optional step 460, resistivity arrays may be extended to the borehole wall. In step 465, an electric current may be imparted into the formation using at least one transceiver. In step 470, a voltage may be impressed on or near the return electrode or on the shield electrode. In some embodiments, step 470 may not be performed. In step 475, current measurements are taken at the transceiver electrode 210.

Method embodiments may include conducting further operations in the earth formation in dependence upon the estimated parameter or upon models created using the estimated parameter. Further operations may include at least one of: i) extending the borehole; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) evaluating the formation; and x) producing one or more hydrocarbons from the formation.

As used above, an information processing device is any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals.

The term "carrier" as used above means any device, device component, combination of devices, media and/or member that may be used to convey, house, support, or otherwise facilitate the use of another device, device component, combination of devices, media and/or member. Exemplary non-limiting carriers include drill strings of the coiled tubing type, of the jointed pipe type, and any combination or portion thereof. Other carrier examples include casing pipes, wirelines, wireline sondes, slickline sondes, drop shots, downhole subs, bottom hole assemblies, drill string inserts, modules, internal housings, and substrate portions thereof.

In some embodiments, the borehole may be utilized to recover hydrocarbons. In other embodiments, the borehole may be used for geothermal applications, water production, mining, tunnel construction, or other uses.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

The estimated resistivity parameter or other parameter of interest may be stored (recorded) as information or visually depicted on a display. Aspects of the present disclosure relate to modeling a volume of an earth formation using an estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

In some embodiments stored data may be used in estimating parameters of interest. These data may be obtained by, for example, retrieving previously acquired data from a data repository, from local memory, or from other associated storage, or may be carried out by retrieving previously calculated or estimated parameters from such storage.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements made in wireline or MWD applications may be done by a surface processor, by a downhole processor, or at a remote location. The data acquisition may be controlled at least in part by the downhole electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

A "downhole fluid" as used herein includes any gas, liquid, flowable solid and other materials having a fluid property, and relating to hydrocarbon recovery. A downhole fluid may be natural or man-made and may be transported downhole or may be recovered from a downhole location.

Non-limiting examples of downhole fluids include drilling fluids, return fluids, formation fluids, production fluids containing one or more hydrocarbons, oils and solvents used in conjunction with downhole tools, water, brine, and combinations thereof. Well fluids may include, any of hydrocarbon fluids, downhole fluids, stimulation fluids, fracking fluids, additives for oil field fluids, mud filtrates, completion fluids, cement slurries, and so on. The term "standoff" as used herein may refer to a radial (e.g., normal to a longitudinal axis of the tool) spacing between the sensor array, or a component thereof, and the borehole wall.

The term "image" as used herein may refer to an at least two-dimensional information set reflective of at least one resistivity property of a volume of interest surrounding the borehole for a selected depth, which may be capable of ready conversion for display (e.g., using colors or different gray scales), of the resistivity parameter at a plurality of azimuthal orientations around a longitudinal axis of the borehole with respect to depth. The x-axis of the image may show different segments of the borehole displayed from the top of the hole clockwise around through the bottom and back to the top again. Depth may be represented in the z-axis, while the values of the resistivity parameter are represented by varying color shades.

While the foregoing disclosure is directed to the one mode embodiments of the disclosure, various modifications will be apparent to those skilled in the art. It is intended that all variations be embraced by the foregoing disclosure.

We claim:

1. An apparatus configured to evaluate a volume of interest of an earth formation intersected by a borehole, the apparatus comprising:
  a tool body configured to be conveyed in the borehole, the tool body having thereon:
    a transceiver electrode on the tool configured to provide electrical current to the earth formation;
    a return electrode configured to receive the electrical current returning from the earth formation;
    a multi-function electrode on the resistivity imager tool, the multi-function electrode configured to be switched between a guard mode and a return mode; and
    a shield electrode between the transceiver electrode and the multi-function electrode; and
  an electrical system configured to provide current measurements at the transceiver electrode indicative of a resistivity parameter of the volume of interest, the electrical system configured to be switched between a first operational mode and a second operational mode, wherein:
    in the first operational mode, the electrical system maintains the tool body at a first electrical potential, and maintains the multi-function electrode and the transceiver electrode at a second electrical potential different than the first potential; and
    in the second operational mode, the electrical system maintains the tool body at the first electrical potential, maintains the multi-function electrode at the first electrical potential, and maintains the transceiver electrode at the second potential different than the first potential.

2. The apparatus of claim 1 wherein the current measurements comprise current amplitude measurements and current phase measurements.

3. The apparatus of claim 2 comprising at least one processor configured to:

estimate complex impedance values from the current measurements and the corresponding second electrical potential in the first operational mode;
estimate complex impedance values from the measured current and the corresponding second electrical potential in the second operational mode; and
estimate a resistivity parameter of the volume of interest using the estimated complex impedance values.

4. The apparatus of claim 3 wherein the tool body is associated with a bottom hole assembly (BHA) and the transceiver electrode is configured for rotation through a plurality of azimuthal orientations during measurement.

5. The apparatus of claim 4 wherein the resistivity parameter comprises a complex impedance of the volume of interest, and the at least one processor is configured to estimate the complex impedance of the volume of interest at the plurality of azimuthal orientations while the BHA is performing drilling operations.

6. The apparatus of claim 2 wherein the at least one processor is configured to estimate a complex impedance of the volume of interest from the current measurements and to provide a standoff image using an imaginary part of the complex impedance.

7. The apparatus of claim 2 wherein the at least one processor is configured to estimate a complex impedance of the volume of interest from the current measurements and to provide a resistivity image using a real part of the complex impedance.

8. The apparatus of claim 1 wherein in the first operational mode, the electrical system provides current to the transceiver electrode at an operational frequency of less than 20 kHz; and, in the second operational mode, the electrical system provides current to the transceiver electrode at an operational frequency of greater than 1 MHz.

9. The apparatus of claim 1 wherein in the first and second operational modes the electrical system maintains the shield electrode at substantially the second electrical potential.

10. A method of evaluating a volume of interest of an earth formation intersected by a borehole, the method comprising:
  conveying a logging tool disposed on a carrier into the borehole, the logging tool including a tool body configured to be conveyed in the borehole, the tool body having thereon:
    a transceiver electrode on the tool configured to provide electrical current to the earth formation;
    a return electrode configured to receive the electrical current returning from the earth formation;
    a multi-function electrode on the resistivity imager tool, the multi-function electrode configured to be switched between a guard mode and a return mode; and
    a shield electrode between the transceiver electrode and the multi-function electrode; and
  using an electrical system to take current measurements at the transceiver electrode indicative of a resistivity parameter of the volume of interest, the electrical system configured to be switched between a first operational mode and a second operational mode, wherein:
    in the first operational mode, the electrical system maintains a tool body at a first electrical potential, maintains the multi-function electrode and the transceiver electrode at a second electrical potential different than the first potential; and
    in the second operational mode, the electrical system maintains the tool body at the first electrical potential, maintains the multi-function electrode at the first electrical potential, and maintains the transceiver electrode at a second potential different than the first potential.

11. The method of claim 10 wherein the current measurements comprise current amplitude measurements and current phase measurements.

12. The method of claim 11 comprising using at least one processor to:
estimate complex impedance values from the current measurements and the corresponding first electrical potential in the first operational mode;
estimate complex impedance values from the measured current and the corresponding fourth electrical potential in the second operational mode; and
estimate a resistivity parameter of the volume of interest using the estimated complex impedance values.

13. The method of claim 11 comprising taking the current measurements in a plurality of azimuthal orientations by rotation of the transceiver electrode around a central axis of the tool body and taking the current measurements during the rotation.

14. The method of claim 12 wherein the resistivity parameter comprises a complex impedance of the volume of interest, the method comprising using the at least one processor to estimate the complex impedance of the volume of interest at the plurality of azimuthal orientations while the BHA is performing drilling operations.

15. The method of claim 10 comprising using the electrical system to provide current to the transceiver electrode at an operational frequency determined responsive to a selection of the operational mode from among the first operational mode and the second operation mode, the operational frequency being of at least one of i) less than 20 kHz; and ii) greater than 1 MHz.

16. The method of claim 10 comprising using the electrical system to maintain the shield electrode at the second electrical potential in both operational modes.

17. The method of claim 10 comprising using the at least one processor to estimate a complex impedance of the volume of interest from the current measurements and to provide a standoff image using an imaginary part of the complex impedance.

18. The method of claim 10 comprising using the at least one processor to estimate a complex impedance of the volume of interest from the current measurements and to provide a resistivity image using a real part of the complex impedance.

19. The method of claim 10 comprising injecting an electric current into the volume of interest of the earth formation.

* * * * *